US009077838B2

(12) United States Patent
Hiramatsu et al.

(10) Patent No.: US 9,077,838 B2
(45) Date of Patent: Jul. 7, 2015

(54) PROCESSING APPARATUS AND NON-TRANSITORY COMPUTER READABLE MEDIUM WITH DETECTIONS SENSORS FOR CONTROLLING POWER

(71) Applicant: FUJI XEROX CO., LTD., Minato-ku, Tokyo (JP)

(72) Inventors: Hisaji Hiramatsu, Kanagawa (JP); Kenji Kuroishi, Kanagawa (JP); Yuji Murata, Kanagawa (JP); Shunsuke Kasahara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/202,924

(22) Filed: Mar. 10, 2014

(65) Prior Publication Data

US 2015/0043024 A1 Feb. 12, 2015

(30) Foreign Application Priority Data

Aug. 9, 2013 (JP) ................................ 2013-165968

(51) Int. Cl.
*H04N 1/00* (2006.01)

(52) U.S. Cl.
CPC ....... *H04N 1/00904* (2013.01); *H04N 1/00891* (2013.01)

(58) Field of Classification Search
CPC .......... H04N 1/00885; H04N 1/00888; H04N 1/00891; H04N 1/00896; H04N 1/00904; H04N 1/00907; G06F 1/32; G06F 1/3284; G06K 15/4055

See application file for complete search history.

(56) References Cited

U.S. PATENT DOCUMENTS

| 2012/0127538 | A1 | 5/2012 | Mamiya et al. |
| 2013/0128298 | A1 | 5/2013 | Yamada |
| 2014/0153013 | A1* | 6/2014 | Imamura ...................... 358/1.12 |

FOREIGN PATENT DOCUMENTS

| JP | 2003-189018 A | 7/2003 |
| JP | 2012-114499 A | 6/2012 |
| JP | 2013-108821 A | 6/2013 |

* cited by examiner

*Primary Examiner* — Thomas D Lee
(74) *Attorney, Agent, or Firm* — Sughrue Mion, PLLC (57) ABSTRACT

A processing apparatus includes following components. Processing units each operate when being supplied with power. A first detector detects an object entering a first detection area. A second detector detects an object entering a second detection area. A first controller controls power supply to the processing units and the first and second detectors. At a start of a power-saving mode, the first controller stops supplying power to the second detector and at least one processing unit and supplies power to the first detector. After the start of the power-saving mode, the first controller restarts supplying power to the second detector when the first detector detects an object entering the first detection area. When the second detector detects an object entering the second detection area in the power-saving mode, the first controller restarts supplying power to the at least one processing unit so as to cancel the power-saving mode.

14 Claims, 10 Drawing Sheets

PROCESSING APPARATUS AND NON-TRANSITORY COMPUTER READABLE MEDIUM WITH DETECTIONS SENSORS FOR CONTROLLING POWER

CROSS-REFERENCE TO RELATED APPLICATIONS

This application is based on and claims priority under 35 USC 119 from Japanese Patent Application No. 2013-165968 filed Aug. 9, 2013.

BACKGROUND

Technical Field

The present invention relates to a processing apparatus and a non-transitory computer readable medium.

SUMMARY

According to an aspect of the invention, there is provided a processing apparatus including multiple processing units, a first detector, a second detector, and a first controller. The multiple processing units each operate when being supplied with electric power. The first detector detects, while being supplied with electric power, an object entering a first detection area. The second detector detects, while being supplied with electric power, an object entering a second detection area narrower than the first detection area. The first controller controls power supply to the multiple processing units, the first detector, and the second detector. At a start of a power-saving mode, the first controller stops supplying electric power to the second detector and at least one processing unit among the multiple processing units and supplies electric power to the first detector. After the start of the power-saving mode, the first controller restarts supplying electric power to the second detector when the first detector detects an object entering the first detection area. When the second detector detects an object entering the second detection area in the power-saving mode, the first controller restarts supplying electric power to the at least one processing unit that has not been supplied with electric power so as to cancel the power-saving mode.

BRIEF DESCRIPTION OF THE DRAWINGS

Exemplary embodiments of the present invention will be described in detail based on the following figures, wherein.

DETAILED DESCRIPTION

Exemplary embodiments for carrying out the present invention (hereinafter, referred to as exemplary embodiments) will be described below with reference to the accompanying drawings.

1. First Exemplary Embodiment

Referring first to FIGS. 1 to 6, an image forming apparatus 1 according to a first exemplary embodiment of the present invention will be described.

1-1. Power Supply System of Image Forming Apparatus 1

Figure 1:
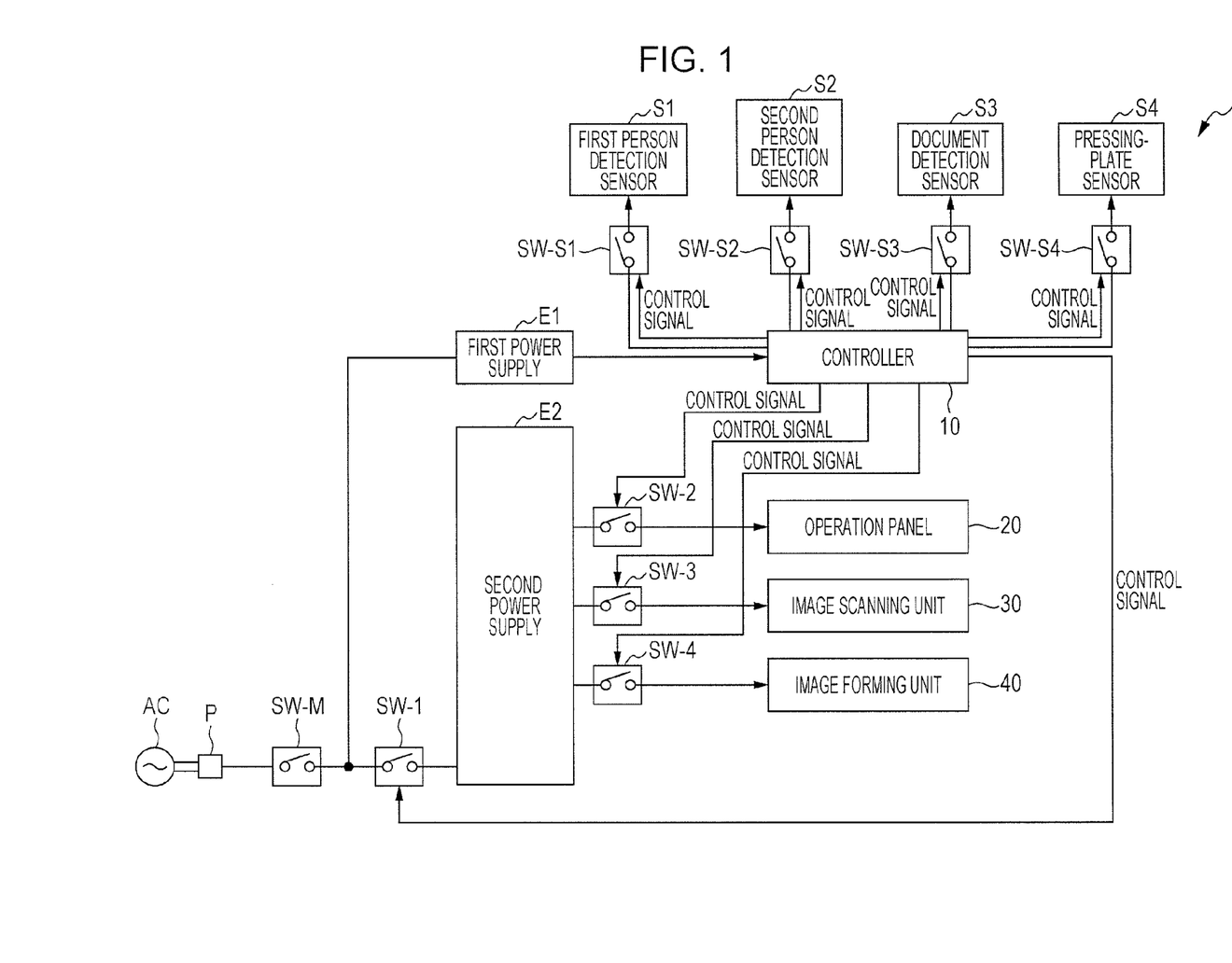
FIG. 1 illustrates the configuration of a power supply system of an image forming apparatus according to a first exemplary embodiment.

FIG. 1 illustrates the configuration of a power supply system of the image forming apparatus 1 according to the first exemplary embodiment. The power supply system of the image forming apparatus 1 illustrated in FIG. 1 is a system that controls power supply to individual pieces of hardware that implement multiple functions of the image forming apparatus 1.

As illustrated in FIG. 1, the image forming apparatus 1 includes pieces of hardware such as a first power supply E1, a second power supply E2, a controller 10, an operation panel 20, an image scanning unit 30 (scanner), an image forming unit 40 (printer), a first person detection sensor S1, a second person detection sensor S2, a document detection sensor S3, and a pressing-plate sensor S4. The image forming apparatus 1 is supplied with electric power (hereinafter, simply referred to as power) from an alternating current (AC) power supply AC via a plug P inserted into an outlet.

The first power supply E1 supplies driving power to the controller 10. Specifically, when a main switch SW-M is turned ON (is conducted), the first power supply E1 is connected to the AC power supply AC. The first power supply E1 converts AC power supplied from the AC power supply AC into direct current (DC) power, and outputs the resulting DC power to the controller 10.

The second power supply E2 supplies driving power to the operation panel 20, the image scanning unit 30, and the image forming unit 40 other than the controller 10. When the main switch SW-M is turned ON (is conducted) and a first switch SW-1 is turned ON (is conducted), the second power supply E2 is connected to the AD power supply AC. In a state where the second power supply E2 is connected to the AC power supply AC, the second power supply E2 supplies power to the operation panel 20 when a second switch SW-2 is turned ON, to the image scanning unit 30 when a third switch SW-3 is turned ON, and to the image forming unit 40 when a fourth switch SW-4 is turned ON.

The controller 10 is a control unit that is supplied with driving power from the first power supply E1 when the main switch SW-M is turned ON (is conducted), that controls components of the image forming apparatus 1, and controls power supply to the operation panel 20, the image scanning unit 30, the image forming unit 40, the first person detection sensor S1, the second person detection sensor S2, the document detection sensor S3, and the pressing-plate sensor S4. Note that details about the configuration of the controller 10 will be described later.

The operation panel 20 includes a display unit, for example, a liquid crystal display device; and an input receiving unit such as buttons and a touch panel. The operation panel 20 is an operation interface that displays an operation window on the display unit and receives an operation input from a user via the input receiving unit. The operation panel 20 is supplied with power when the main switch SW-M, the first switch SW-1, and the second switch SW-2 are turned ON.

The image scanning unit 30 is an image scanner that scans an image of a document. The image scanning unit 30 includes a document table; a scanning system configured to perform a scan by radiating light to an image of a document positioned on the document table; and a photo-sensitive element, such as a charge coupled device (CCD), that receives light radiated to the document through a scan performed by the scanning system and converts the received light into a signal. The image scanning unit 30 may also include an automatic document feeder, and may transport one or more documents positioned on the automatic document feeder to the document table one by one and sequentially scan images of the transported documents.

The image forming unit 40 is a printer that forms an image on a print sheet (medium). The image forming unit 40 may execute a copy process of forming an image scanned by the image scanning unit 30 on a print sheet, and a printing process of forming an image acquired from an external device on a print sheet.

The first person detection sensor S1 is a sensor that is implemented by, for example, an infrared sensor using pyroelectric elements and detects whether a person (object) is present within a detection area. The first person detection sensor S1 has a wider detection area than the second person detection sensor S2 described later, and detects a person who is approaching the image forming apparatus 1. For example, the detection area of the first person detection sensor S1 may be, for example, 2 to 3 m from the image forming apparatus 1.

The second person detection sensor S2 is a sensor that is implemented by, for example, a reflection sensor that receives reflected light of light emitted from a light emitter and detects whether a person (object) is present within a detection area. The second person detection sensor S2 has a narrower detection area than the first person detection sensor S1 and detects a person who is about to operate the image forming apparatus 1. For example, the detection area of the second person detection sensor S2 may be, for example, approximately 0.5 m or less from the image forming apparatus 1.

The document detection sensor S3 is a sensor that is provided at the automatic document feeder and detects whether one or more documents are positioned on the automatic sheet feeder.

The pressing-plate sensor S4 is a sensor that detects opening and closing of a pressing plate that presses a document positioned on the document table from the above.

Now, power supply control performed by the controller 10 will be described. The controller 10 outputs control signals for controlling ON (conduction)/OFF (out of conduction) of the first switch SW-1 for controlling power supply to the second power supply E2, the second switch SW-2 for controlling power supply to the operation panel 20 from the second power supply E2, the third switch SW-3 for controlling power supply to the image scanning unit 30 from the second power supply E2, and the fourth switch SW-4 for controlling power supply to the image forming unit 40 from the second power supply E2, to these switches so as to control ON/OFF of the first to fourth switches SW-1 to SW-4.

The controller 10 also outputs control signals for controlling ON (conduction)/OFF (out of conduction) of a fifth switch SW-S1 for controlling power supply to the first person detection sensor S1, a sixth switch SW-S2 for controlling power supply to the second person detection sensor S2, a seventh switch SW-S3 for controlling power supply to the document detection sensor S3, and an eighth switch SW-S4 for controlling power supply to the pressing-plate sensor S4, to these switches so as to control ON/OFF of the fifth to eighth switches SW-S1 to SW-S4.

1-2. Controller 10 of Image Forming Apparatus 1

Figure 2:
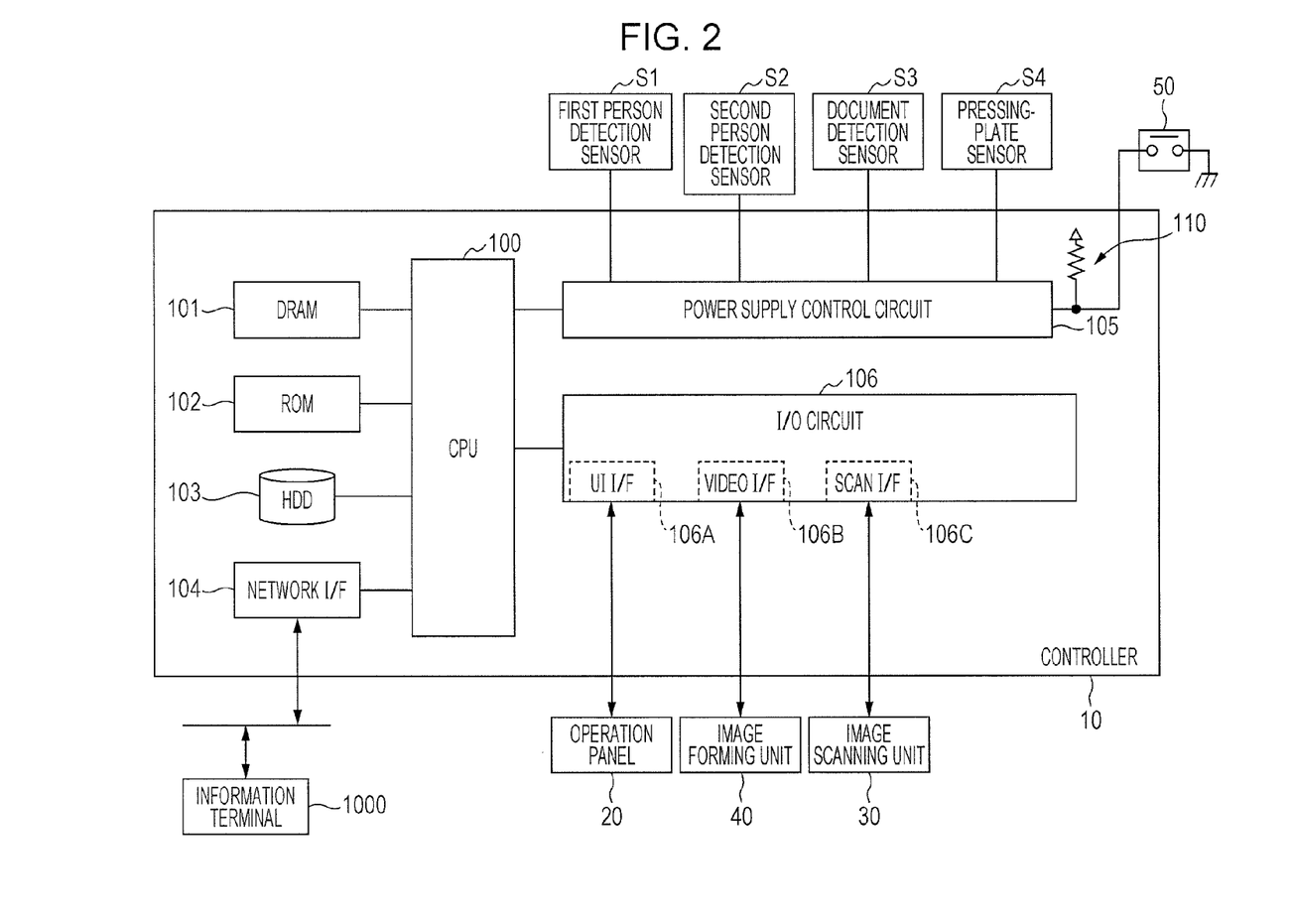
FIG. 2 illustrates the configuration of a controller.

Referring next to FIG. 2, a detailed configuration of the controller 10 will be described.

As illustrated in FIG. 2, the controller 10 includes a central processing unit (CPU) 100, a dynamic random access memory (DRAM) 101, a read only memory (ROM) 102, a hard disk drive (HDD) 103, a network interface (I/F) 104, a power supply control circuit 105, an input/output (I/O) circuit 106.

The CPU 100 is a central processor that controls the components of the controller 10.

The DRAM 101 is used as a main memory of the controller 10, and is a nonvolatile memory that stores data and programs. For example, the CPU 100 may copy a program stored in the ROM 102 to the DRAM 101.

The ROM 102 is a nonvolatile memory storing programs of the controller 10, for example.

The HDD 103 is a magnetic storage device used as an auxiliary storage device of the controller 10. For example, the HDD 103 may store image data obtained by the image forming apparatus 1, data of a job received from an external device, and so forth.

The network I/F 104 includes, for example, an network interface card (NIC), and communicates via the NIC with another device (for example, an information terminal 1000) connected to a network.

The power supply control circuit 105 controls power supply to the first person detection sensor S1, the second person detection sensor S2, the document detection sensor S3, and the pressing-plate sensor S4 (that is, controls ON/OFF of the first person detection sensor S1, the second person detection sensor S2, the document detection sensor S3, and the pressing-plate sensor S4). The power supply control circuit 105 also receives detection signals from the first person detection sensor S1, the second person detection sensor S2, the document detection sensor S3, and the pressing-plate sensor S4. The power supply control circuit 105 is connected to a power-saving button 50 included in the image forming apparatus 1, and receives an ON/OFF input from the power-saving button 50. Note that a circuit that connects the power supply control circuit 105 and the power-saving button 50 includes a pull-up resistor 110.

Figure 3:
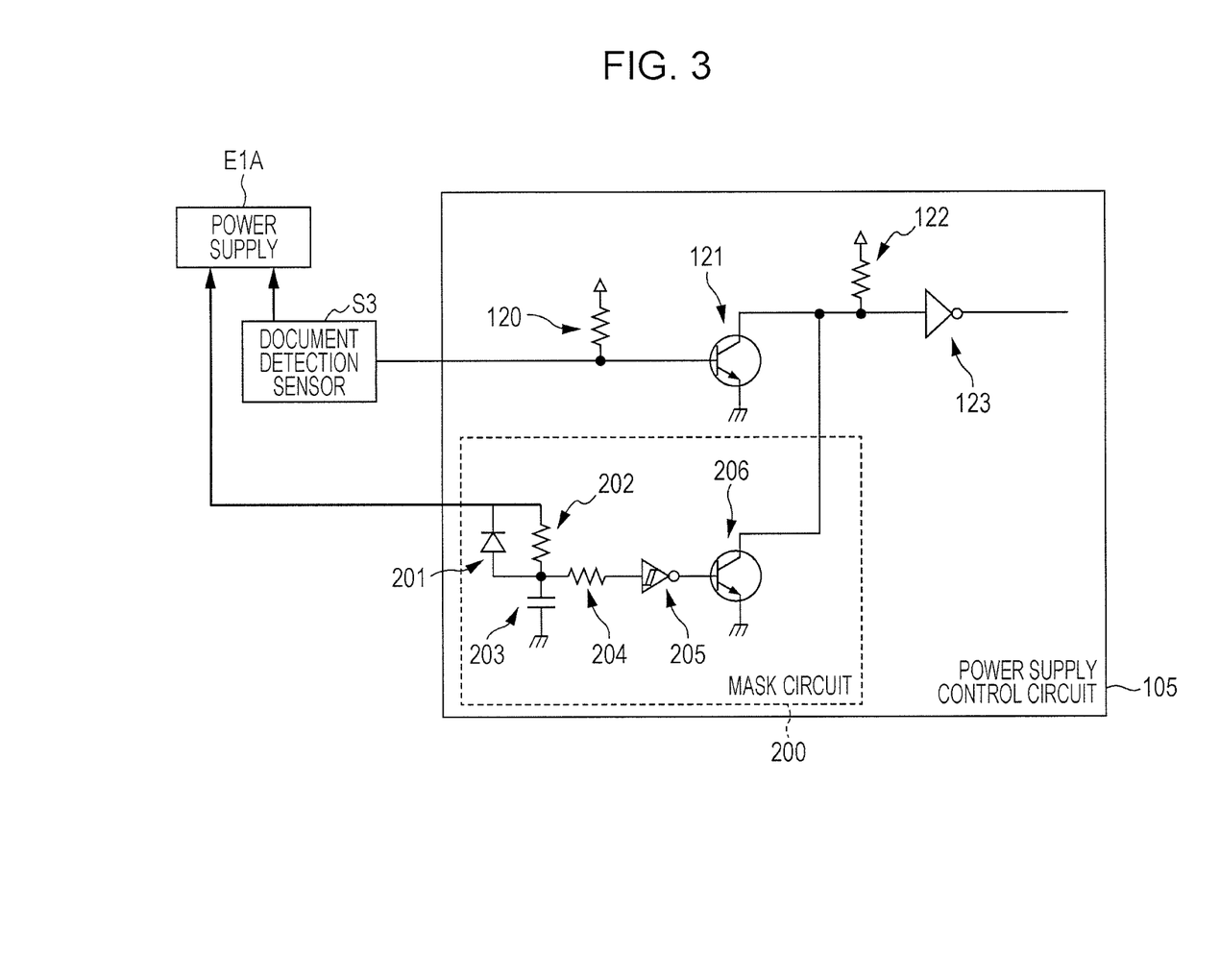
FIG. 3 illustrates a mask circuit provided in a power supply control circuit.

In the power supply control circuit 105, a circuit connected to the document detection sensor S3 (or the pressing-plate sensor S4) may include a mask circuit that prevents occurrence of erroneous detection caused when a noise signal generated immediately after the document detection sensor S3 (or the pressing-plate sensor S4) is switched from OFF to ON is input to the power supply control circuit 105. Now, the mask circuit provided in the power supply control circuit 105 will be described with reference to FIG. 3. Note that FIG. 3 illustrates an example where a mask circuit 200 is provided for the document detection sensor S3. However, the mask circuit 200 may obviously be provided for the pressing-plate sensor S4.

As illustrated in FIG. 3, the power supply control circuit 105 includes a first pull-up resistor 120 provided in a line to which a detection signal is input from the document detection sensor S3 supplied with power from a power supply E1A. The line including the first pull-up resistor 120 is connected to the base of a transistor 121. The emitter of the transistor 121 is grounded, and a line connected to the collector of the transistor 121 is connected to a second pull-up resistor 122 and an inverter 123.

The power supply control circuit 105 also includes the mask circuit 200 connected between the power supply E1A and a node between the collector of the transistor 121 and the second pull-up resistor 122. Specifically, the mask circuit 200 includes a diode 201, a first resistor 202, a capacitor 203, a second resistor 204, a Schmitt trigger inverter 205, and a transistor 206. The mask circuit 200 is capable of preventing a signal output from the document detection sensor S3 immediately after power supply from the power supply E1A to the document detection sensor S3 is started from being output to the inverter 123. The example of the mask circuit 200 illustrated in FIG. 3 uses a capacitor and registers. However, the output signal output immediately after the document detection sensor S3 (pressing-plate sensor S4) is turned ON may be masked using a reset generation device.

Referring back to FIG. 2, the I/O circuit 106 is connected to and performs data communication with the operation panel 20, the image forming unit 40, and the image scanning unit 30. The I/O circuit 106 may also include a user interface (UI) I/F 106A, a video I/F 106B, and a scan I/F 106C; and communicate with the operation panel 20 via the UI I/F 106A, with the image forming unit 40 via the video I/F 106B, and the image scanning unit 30 via the scan I/F 106C.

1-3. Description of Details of Processes

The image forming apparatus 1 according to the first exemplary embodiment may enter a power-saving mode when the power-saving button 50 is pressed or when the image forming apparatus 1 has not been used for a preset period. Referring next to flowcharts illustrated in FIGS. 4 to 6, details of processes performed when the image forming apparatus 1 enters and is in the power-saving mode will be described.

1-3-1. Process to Enter Power-Saving Mode

Referring first to the flowchart illustrated in FIG. 4, details of the process to enter the power-saving mode will be described.

Figure 4:
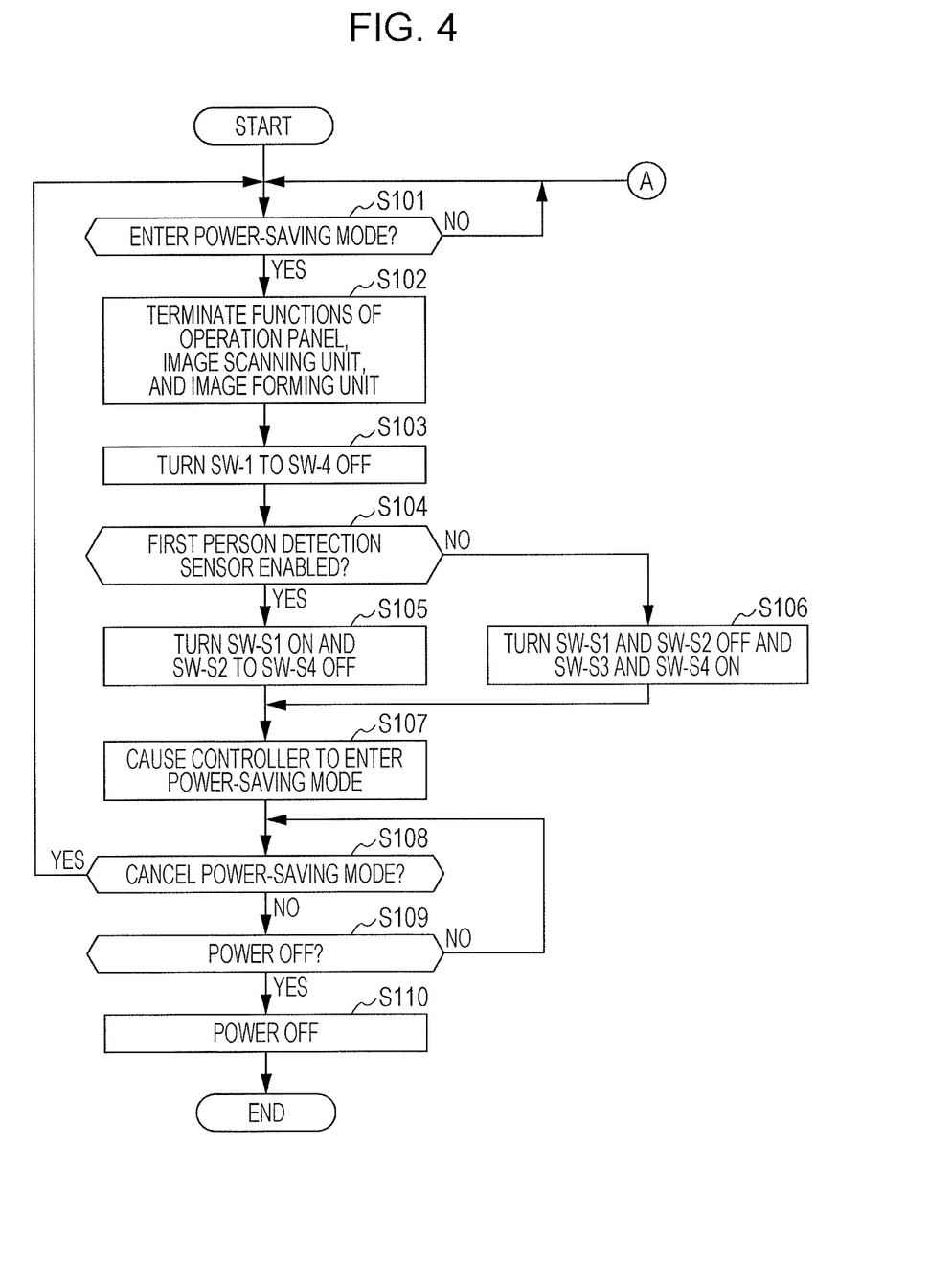
FIG. 4 is a flowchart of a power-saving-mode entering process.

As illustrated in FIG. 4, the image forming apparatus 1 determines whether or not to enter the power-saving mode while in a normal mode (S101). If the image forming apparatus 1 determines not to enter the power-saving mode (NO in S101), the image forming apparatus 1 keeps operating in the normal mode. If the image forming apparatus 1 determines to enter the power-saving mode (YES in S101), the process proceeds to S102. Note that the image forming apparatus 1 may determine to enter the power-saving mode when the power-saving button 50 is pressed or when the image forming apparatus 1 has not been used for a preset period.

When entering the power-saving mode (YES in S101), the image forming apparatus 1 terminates functions of the operation panel 20, the image scanning unit 30, and the image forming unit 40 (S102); and turns the first to fourth switches SW-1 to SW-4 OFF (S103) so as to stop supplying power to the operation panel 20, the image scanning unit 30, and the image forming unit 40.

If the first person detection sensor S1 is enabled (that is, is not disabled) (YES in S104), the image forming apparatus 1 turns only the fifth switch SW-S1 ON and turns the sixth to eighth switches SW-S2 to SW-S4 OFF (S105) so as to stop supplying power to the sensors other than the first person detection sensor S1.

If the first person detection sensor S1 is not enabled (that is, is disabled) (NO in S104), the image forming apparatus 1 turns the fifth and sixth switches SW-S1 and SW-S2 OFF and turns the seventh and eighth switches SW-S3 and SW-S4 ON (S106) so as to stop supplying power to the sensors other than the document detection sensor S3 and the pressing-plate sensor S4.

The image forming apparatus 1 then causes the controller 10 to enter the power-saving mode (S107). Specifically, while the controller 10 is in the power-saving mode, the image forming apparatus 1 may supply power to the power supply control circuit 105, the network I/F 104, the DRAM 101 in the self-refresh state, and part of the CPU 100 of the controller 10 and stop supplying power to the rest of the components of the controller 10.

After entering the power-saving mode, the image forming apparatus 1 possibly receives a detection signal from the first person detection sensor S1 or to-be-processed data via the network I/F 104. If the image forming apparatus 1 cancels the power-saving mode in response to such an event (YES in S108), the process returns to S101, and the following steps are executed.

If the image forming apparatus 1 determines not to cancel the power-saving mode (NO in S108) and not to turn OFF (NO in S109), the process returns to S108. If the image forming apparatus 1 determine to turn OFF (YES in S109), the image forming apparatus 1 turns OFF and the process ends.

1-3-2. First Process in Power-Saving Mode

Referring next to the flowcharts illustrated in FIGS. 5 and 6, processes executed by the image forming apparatus 1 in the power-saving mode will be described.

Referring first to the flowchart illustrated in FIG. 5, a first process executed by the image forming apparatus 1 in the power-saving mode will be described.

Figure 5:
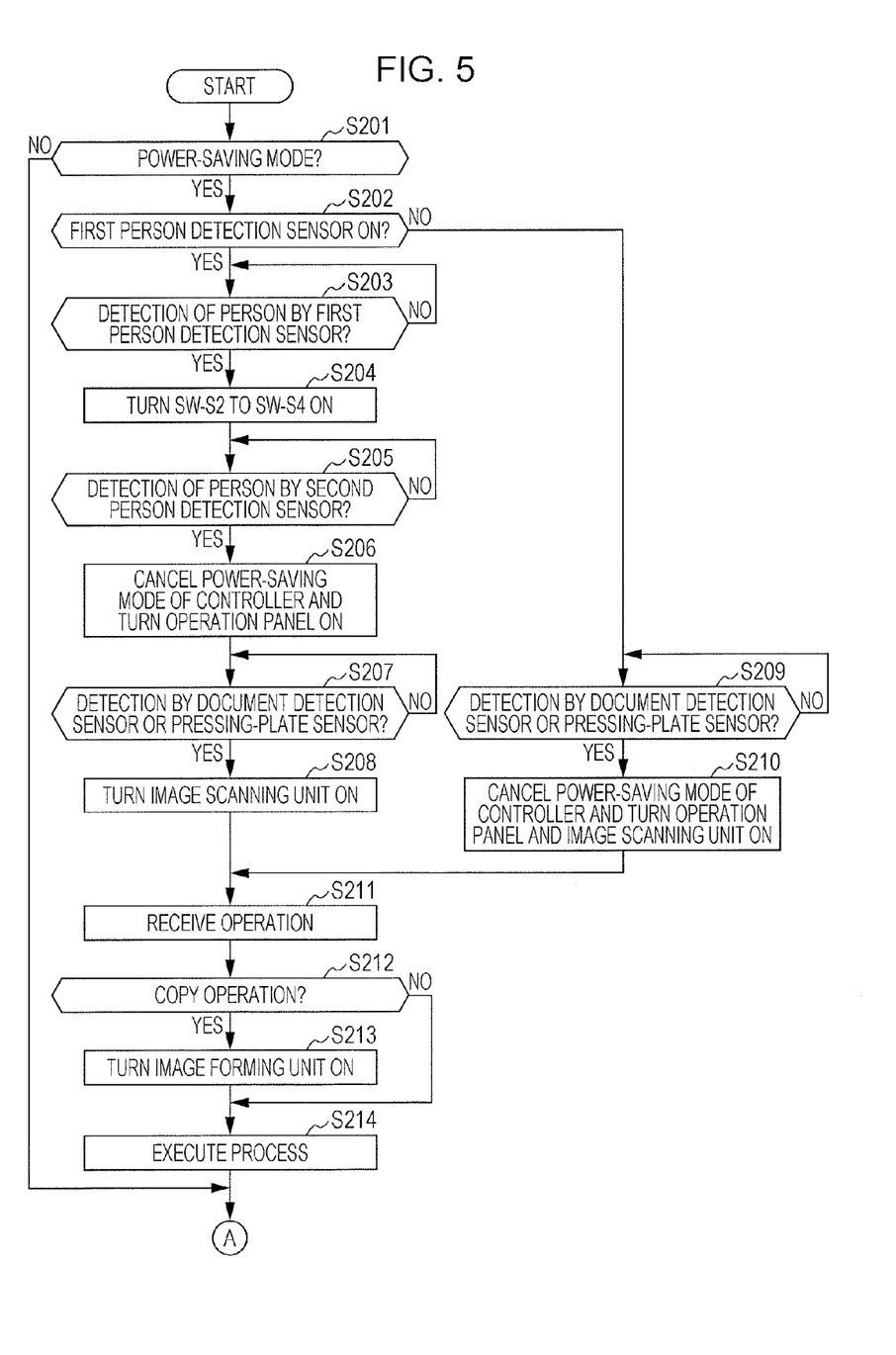
FIG. 5 is a flowchart of a process performed in a power-saving mode.

As illustrated in FIG. 5, if the image forming apparatus 1 is not in the power-saving mode (NO in S201), the process exits and returns to S101 of FIG. 4. If the image forming apparatus 1 is in the power-saving mode (YES in S201), the process proceeds to S202.

If the image forming apparatus 1 determines in S202 that the first person detection sensor S1 is ON (that is, enabled) (YES in S202), the process proceeds to S203.

If the first person detection sensor S1 detects a person (that is, outputs a detection signal) in S203 (YES in S203), the process proceeds to S204. If the first person detection sensor S1 does not detect anyone (that is, does not output any detection signal) (NO in S203), the image forming apparatus 1 repeatedly performs the determination of S203.

If the first person detection sensor S1 detects a person (that is, outputs a detection signal) (YES in S203), the image forming apparatus 1 turns the sixth to eighth switches SW-S2 to SW-S4 ON (S204) so as to start supplying power to the second person detection sensor S2, the document detection sensor S3, and the pressing-plate sensor S4 that have not been supplied with power, and updates the operation state.

If the second person detection sensor S2 that is in the operating state detects a person (that is, outputs a detection signal) (YES in S205), the process proceeds to S206. If the second person detection sensor S2 does not detect anyone (that is, does not output any detection signal) (NO in S205), the image forming apparatus 1 repeatedly performs the determination of S205.

If the second person detection sensor S2 detects a person (that is, outputs a detection signal) (YES in S205), the image forming apparatus 1 cancels the power-saving mode of the controller 10, and turns the first and second switches SW-1 and SW-2 ON so as to turn the operation panel 20 ON (that is, the conduction state) (S206). The power-saving mode of the controller 10 may be cancelled by starting supplying power to hardware of the controller 10 whose power supply has been stopped.

If the document detection sensor S3 or the pressing-plate sensor S4 that is in the operating state outputs a detection signal (YES in S207), the process proceeds to S208. If neither the document detection sensor S3 nor the pressing-plate sensor S4 outputs any detection signal (NO in S207), the image forming apparatus 1 repeatedly performs the determination of S207.

If the document detection sensor S3 or the pressing-plate sensor S4 that is in the operating state outputs a detection signal (YES in S207), the image forming apparatus 1 turns the third switch SW-3 ON so as to turn the image scanning unit 30 ON (that is, the conduction state) (S208).

If the image forming apparatus 1 determines in S202 that the first person detection sensor S1 is not ON (that is, disabled) (NO in S202), the process proceeds to S209.

If the document detection sensor S3 or the pressing-plate sensor S4 outputs a detection signal in S209 (YES in S209), the process proceeds to S210. If neither the document detection sensor S3 nor the pressing-plate sensor S4 outputs any detection signal (NO in S209), the image forming apparatus 1 repeatedly performs the determination of S209.

If the document detection sensor S3 or the pressing-plate sensor S4 outputs a detection signal in S209 (YES in S209), the image forming apparatus 1 cancels the power-saving mode of the controller 10, and turns the first to third switches SW-1 to SW-3 ON so as to turn the operation panel 20 and the image scanning unit 30 ON (that is, the conduction state) (S210).

After S208 or S210, if the image forming apparatus 1 receives an operation via the operation panel 20 (S211) and the received operation is a copy operation (YES in S212), the image forming apparatus 1 turns the fourth switch SW-4 ON so as to turn the image forming unit 40 ON (that is, the conduction state) (S213), and executes a copy process (S214). If the received operation is not a copy operation (NO in S212), the image forming unit 40 is kept OFF and the image forming apparatus 1 executes a process based on the received operation (S214). After the image forming apparatus 1 executes the process, the process returns to S101 of FIG. 4.

If a detection signal is output from the document detection sensor S3 or the pressing-plate sensor S4 before the second person detection sensor S2 detects a person in the flowchart of FIG. 5, the image forming apparatus 1 may cancel the power-saving mode of the controller 10, and turn the first to third switches SW-1 to SW-3 ON so as to turn the operation panel 20 and the image scanning unit 30 ON (that is, the conduction state).

If no detection signal has been output from any of the sensors over a predetermined period after the second person detection sensor S2, the document detection sensor S3, and the pressing-plate sensor S4 were turned ON in the flowchart illustrated in FIG. 5, the image forming apparatus 1 may turn the sixth to eighth switches SW-S2 to SW-S4 OFF again.

1-3-3. Second Process in Power-Saving Mode

Referring next to a flowchart illustrated in FIG. 6, a second process executed by the image forming apparatus 1 in the power-saving mode will be described.

Figure 6:
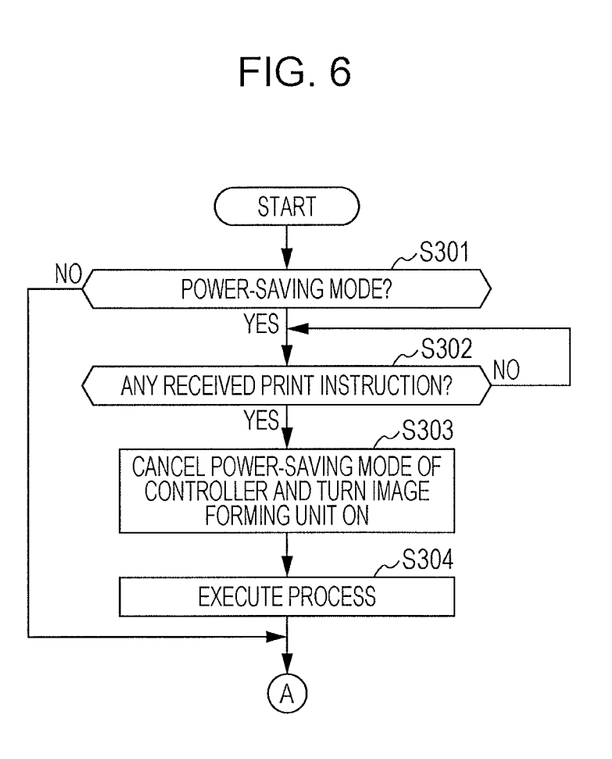
FIG. 6 is a flowchart of a process performed in the power-saving mode.

As illustrated in FIG. 6, if the image forming apparatus 1 is not in the power-saving mode (NO in S301), the process exits and returns to S101 of FIG. 4. If the image forming apparatus 1 is in the power-saving mode (YES in S301), the process proceeds to S302.

If the image forming apparatus 1 receives a print instruction via the network I/F 104 in S302 (YES in S302), the process proceeds to S303. If the image forming apparatus 1 receives no print instruction via the network I/F 104 (NO in S302), the image forming apparatus 1 repeatedly performs the determination of S302.

If the image forming apparatus 1 receives a print instruction via the network I/F 104 (YES in S302), the image forming apparatus 1 cancels the power-saving mode of the controller 10 and turns the first and fourth switches SW-1 and SW-4 ON so as to turn the image forming unit 40 ON (that is, the conduction state) (S303).

The image forming apparatus 1 executes a printing process based on the received print instruction using the image forming unit 40 that is in the operating state (S304). After the image forming apparatus 1 executes the process, the process returns to S101 of FIG. 4.

The above is an example of processes executed by the image forming apparatus 1 according to the first exemplary embodiment. In the first exemplary embodiment, one sensor is supplied with power in the power-saving mode. Also, the image forming apparatus 1 according to the first exemplary embodiment may activate another sensor in accordance with a detection signal of the sensor that is active in the power-saving mode and may activate a to-be-used function based on the detection signal of the active sensor.

2. Second Exemplary Embodiment

Figure 7:
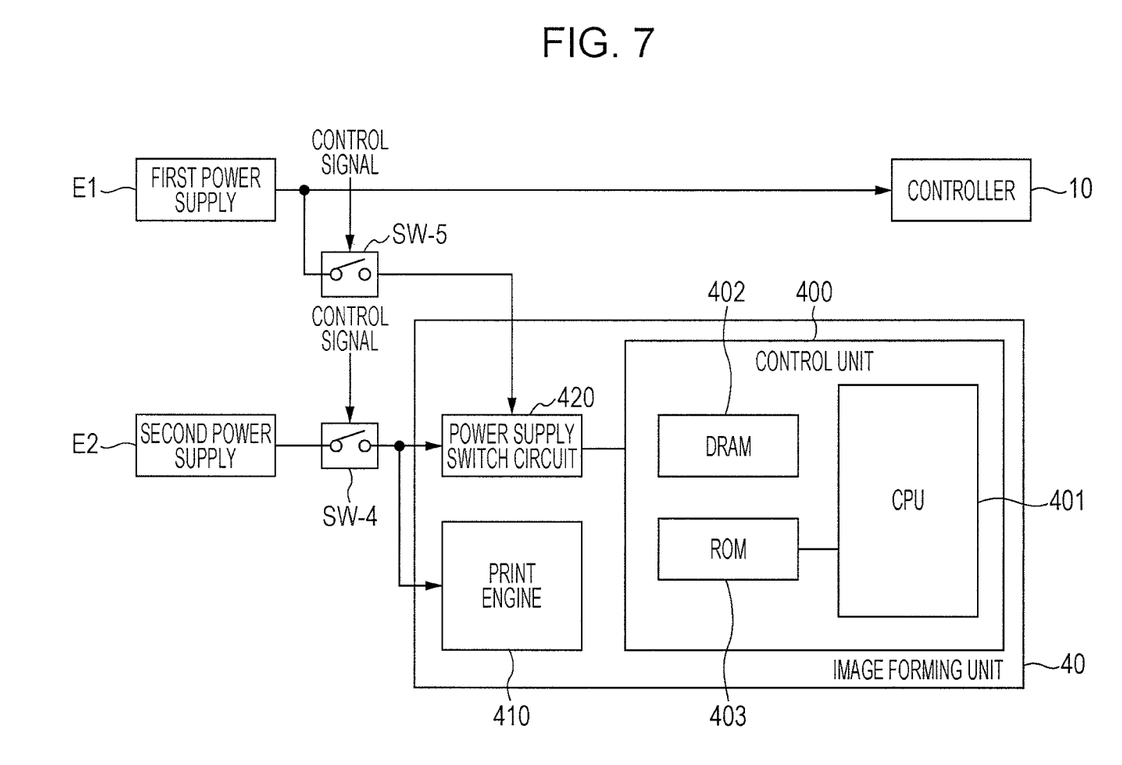
FIG. 7 illustrates the configuration of a power supply system of an image forming apparatus according to a second exemplary embodiment.

A second exemplary embodiment of the present invention will be described next. The image forming apparatus 1 according to the second exemplary embodiment is the same as the image forming apparatus 1 according to the first exemplary embodiment except for that the image forming apparatus 1 according to the second exemplary embodiment additionally includes a switch SW-5 for controlling power supply to a control unit 400 of the image forming unit 40. Accordingly, the description of common points is omitted and only the difference will be described.

2-1. Power Supply System of Image Forming Apparatus 1

FIG. 7 illustrates a portion of a power supply system of the image forming apparatus 1 according to the second exemplary embodiment. FIG. 7 illustrates a portion of the power supply system related to the image forming unit 40 which differs from that of the first exemplary embodiment.

As illustrated in FIG. 7, the image forming unit 40 of the image forming apparatus 1 according to the second exemplary embodiment includes the control unit 400 that controls the image forming unit 40, a print engine 410 that implements an image forming function, and a power supply switch circuit 420. Note that the control unit 400 includes a CPU 401, a DRAM 402, and a ROM 403.

The image forming apparatus 1 also includes the switch SW-5 for controlling ON/OFF of power supply from the first power supply E1 to the power supply switch circuit 420 of the image forming unit 40. The switch SW-5 is switched between ON and OFF based on a control signal supplied from the controller 10.

When the switch SW-5 is turned ON, the power supply switch circuit 420 supplies power from the first power supply E1 to the control unit 400, and does not supply power to the print engine 410. When the fourth switch SW-4 is turned ON, the power supply switch circuit 420 supplies power from the second power supply E2 to the print engine 410 and also supplies power from the second power supply E2 to the control unit 400.

2-2. Description of Details of Processes

Referring next to flowcharts illustrated in FIGS. 8 to 9B, details of processes performed when the image forming apparatus 1 according to the second exemplary embodiment enters and is in the power-saving mode will be described.

2-2-1. Process to Enter Power-Saving Mode

Figure 8:
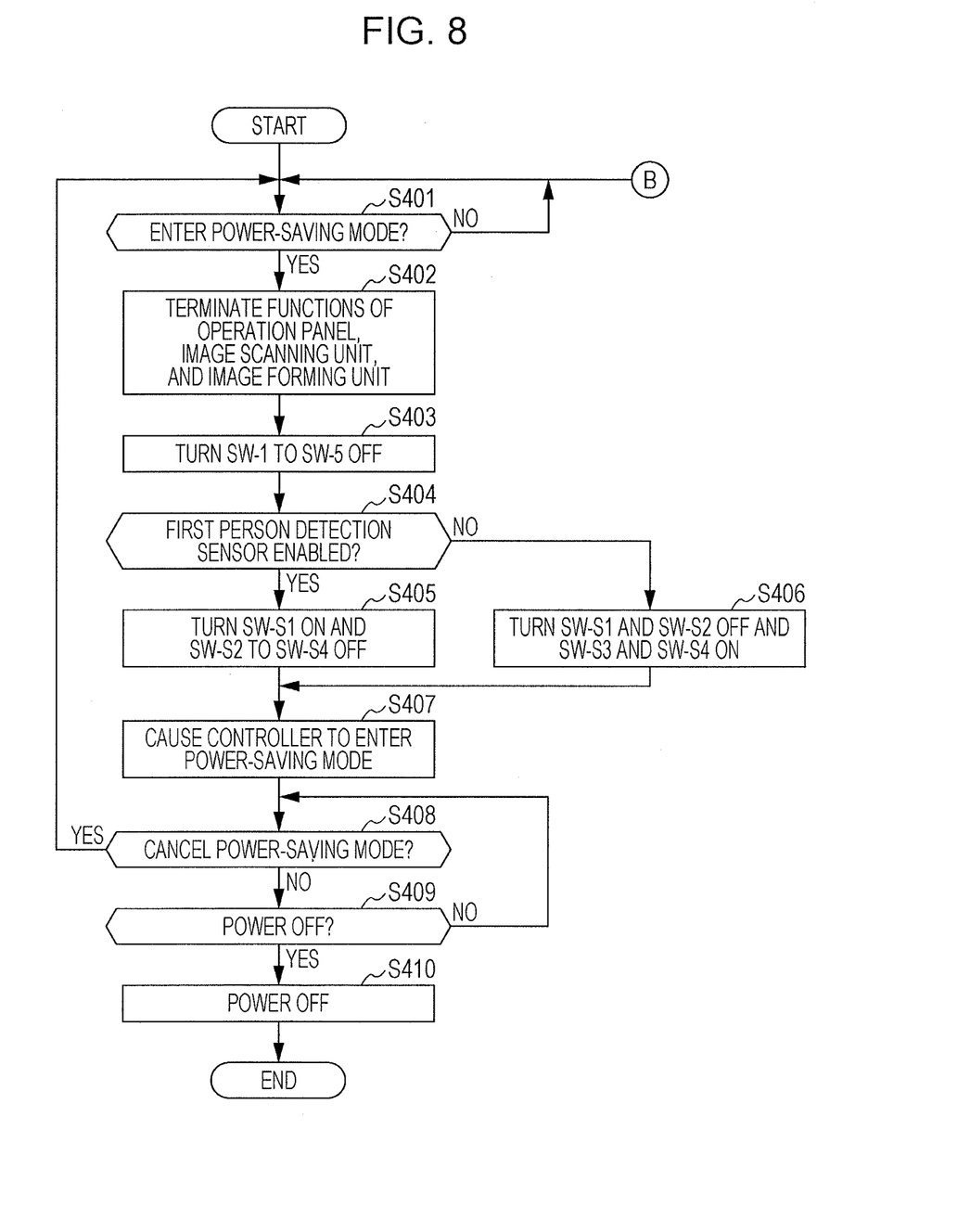
FIG. 8 is a flowchart of a power-saving-mode entering process.

As illustrated in FIG. 8, the image forming apparatus 1 determines whether or not to enter the power-saving mode while in a normal mode (S401). If the image forming apparatus 1 determines not to enter the power-saving mode (NO in S401), the image forming apparatus 1 keeps operating in the normal mode. If the image forming apparatus 1 determines to enter the power-saving mode (YES in S401), the process proceeds to S402. Note that the image forming apparatus 1 may determine to enter the power-saving mode when the power-saving button 50 is pressed or when the image forming apparatus 1 has not been used for a preset period.

When entering the power-saving mode (YES in S401), the image forming apparatus 1 terminates functions of the operation panel 20, the image scanning unit 30, and the image forming unit 40 (S402); and turns the first to fourth switches SW-1 to SW-4 and the switch SW-5 OFF (S403) so as to stop supplying power to the operation panel 20, the image scanning unit 30, and the image forming unit 40.

If the first person detection sensor S1 is enabled (that is, is not disabled) (YES in S404), the image forming apparatus 1 turns only the fifth switch SW-S1 ON and turns the sixth to eighth switches SW-S2 to SW-S4 OFF (S405) so as to stop supplying power to the sensors other than the first person detection sensor S1.

If the first person detection sensor S1 is not enabled (that is, is disabled) (NO in S404), the image forming apparatus 1 turns the fifth and sixth switches SW-S1 and SW-S2 OFF and turns the seventh and eighth switches SW-S3 and SW-S4 ON (S406) so as to stop supplying power to the sensors other than the document detection sensor S3 and the pressing-plate sensor S4.

The image forming apparatus 1 then causes the controller 10 to enter the power-saving mode (S407). Specifically, while the controller 10 is in the power-saving mode, the image forming apparatus 1 may supply power to the power supply control circuit 105, the network I/F 104, the DRAM 101 in the self-refresh state, and part of the CPU 100 of the controller 10 and stop supplying power to the rest of the components of the controller 10.

After entering the power-saving mode, the image forming apparatus 1 possibly receives a detection signal from the first person detection sensor S1 or to-be-processed data via the network I/F 104. If the image forming apparatus 1 cancels the power-saving mode in response to such an event (YES in S408), the process returns to S401, and the following steps are executed.

If the image forming apparatus 1 determines not to cancel the power-saving mode (NO in S408) and not to turn OFF (NO in S409), the process returns to S408. If the image forming apparatus 1 determines to turn OFF (YES in S409), the image forming apparatus 1 turns OFF and the process ends.

2-2-2. Process in Power-Saving Mode

Referring next to flowcharts illustrated in FIGS. 9A and 9B, a process executed by the image forming apparatus 1 according to the second exemplary embodiment in the power-saving mode will be described.

Figure 9A:
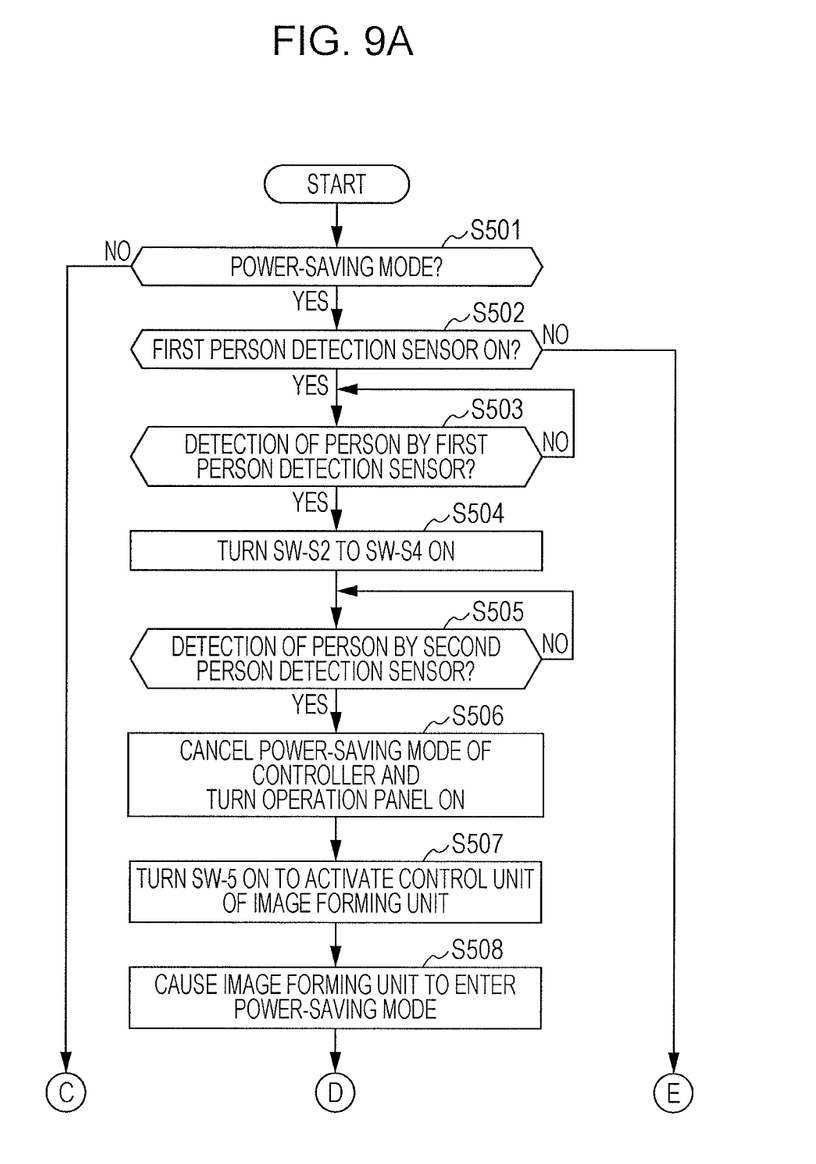
FIGS. 9A and 9B are flowcharts of a process performed in the power-saving mode.
Figure 9B:
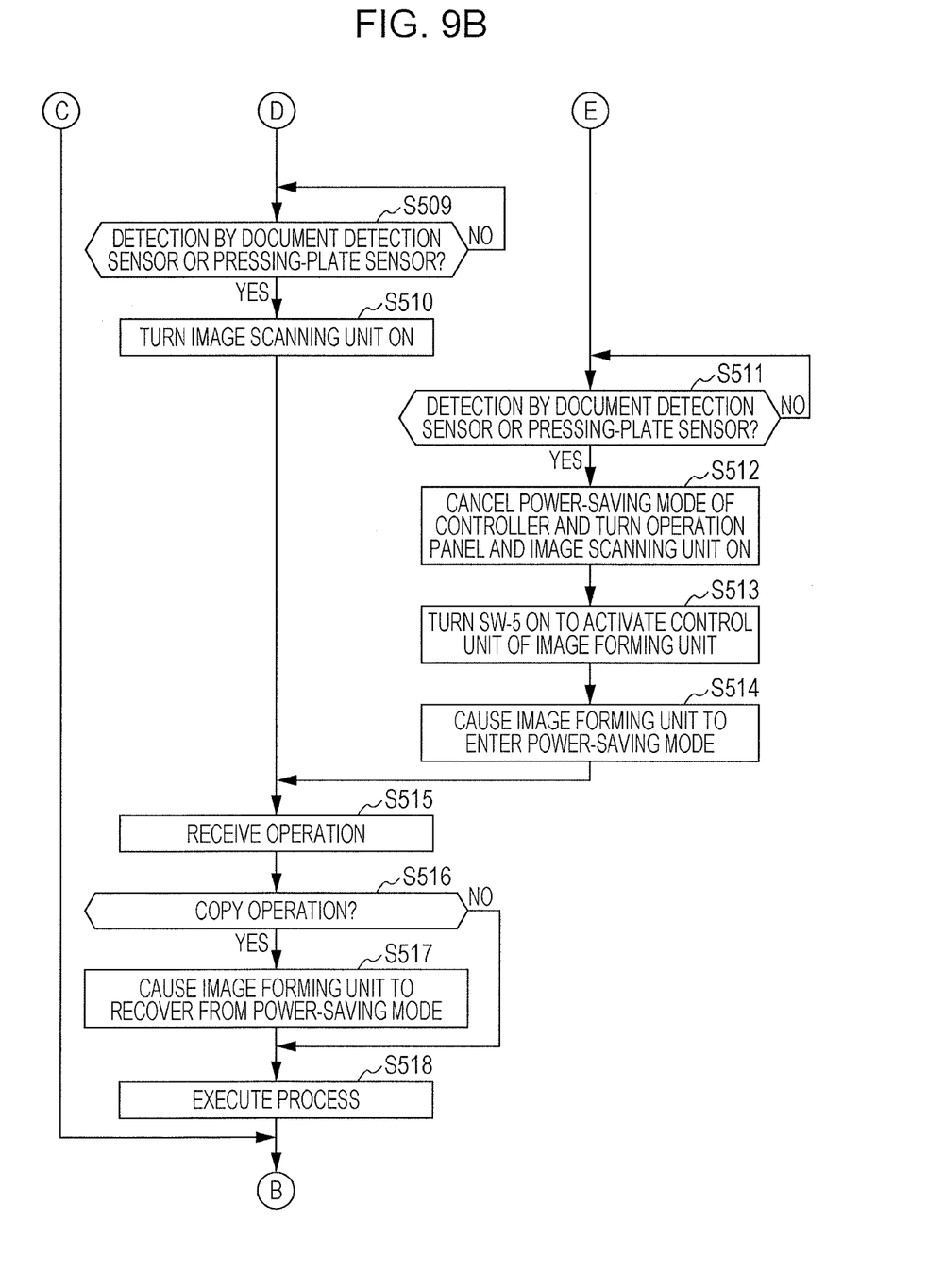

As illustrated in FIGS. 9A and 9B, if the image forming apparatus 1 is not in the power-saving mode (NO in S501), the process exits and returns to S401 of FIG. 8. If the image forming apparatus 1 is in the power-saving mode (YES in S501), the process proceeds to S502.

If the image forming apparatus 1 determines in S502 that the first person detection sensor S1 is ON (that is, enabled) (YES in S502), the process proceeds to S503.

If the first person detection sensor S1 detects a person (that is, outputs a detection signal) in S503 (YES in S503), the process proceeds to S504. If the first person detection sensor S1 does not detect anyone (that is, does not output any detection signal) (NO in S503), the image forming apparatus 1 repeatedly performs the determination of S503.

If the first person detection sensor S1 detects a person (that is, outputs a detection signal) (YES in S503), the image forming apparatus 1 turns the sixth to eighth switches SW-S2 to SW-S4 ON (S504) so as to start supplying power to the second person detection sensor S2, the document detection sensor S3, and the pressing-plate sensor S4 that have not been supplied with power, and updates the operation state.

If the second person detection sensor S2 that is in the operating state detects a person (that is, outputs a detection signal) (YES in S505), the process proceeds to S506. If the second person detection sensor S2 does not detect anyone (that is, does not output any detection signal) (NO in S505), the image forming apparatus 1 repeatedly performs the determination of S505.

If the second person detection sensor S2 detects a person (that is, outputs a detection signal) (YES in S505), the image forming apparatus 1 cancels the power-saving mode of the controller 10, and turns the first and second switches SW-1 and SW-2 ON so as to turn the operation panel 20 ON (that is, the conduction state) (S506).

Then, the image forming apparatus 1 turns the switch SW-5 ON so as to activate the control unit 400 of the image forming unit 40 (S507). Specifically, the control unit 400 of the image forming unit 40 copies a program stored in the ROM 403 to the DRAM 402. If there is no power-saving recovery request from the controller 10, the CPU 401 of the image forming unit 40 of the image forming apparatus 1 enters the power-saving mode in which the DRAM 402 is caused to enter the self-refresh mode, the clock of the CPU 401 is stopped and power of a portion of the CPU 401 is turned OFF so as to reduce power consumption (S508).

If the document detection sensor S3 or the pressing-plate sensor S4 that is in the operating state outputs a detection signal (YES in S509), the process proceeds to S510. If neither the document detection sensor S3 nor the pressing-plate sensor S4 outputs any detection signal (NO in S509), the image forming apparatus 1 repeatedly performs the determination of S509.

If the document detection sensor S3 or the pressing-plate sensor S4 that is in the operating state outputs a detection signal (YES in S509), the image forming apparatus 1 turns the third switch SW-3 ON so as to turn the image scanning unit 30 ON (that is, the conduction state) (S510).

If the image forming apparatus 1 determines in S502 that the first person detection sensor S1 is not ON (that is, disabled) (NO in S502), the process proceeds to S511.

If the document detection sensor S3 or the pressing-plate sensor S4 outputs a detection signal in S511 (YES in S511), the process proceeds to S512. If neither the document detection sensor S3 nor the pressing-plate sensor S4 outputs any detection signal (NO in S511), the image forming apparatus 1 repeatedly performs the determination of S511.

If the document detection sensor S3 or the pressing-plate sensor S4 outputs a detection signal in S511 (YES in S511), the image forming apparatus 1 cancels the power-saving mode of the controller 10, and turns the first to third switches SW-1 to SW-3 ON so as to turn the operation panel 20 and the image scanning unit 30 ON (that is, the conduction state) (S512).

Then, the image forming apparatus 1 turns the switch SW-5 ON so as to activate the control unit 400 of the image forming unit 40 (S513). Thereafter, if there is no power-saving recovery request from the controller 10, the CPU 401 of the image forming unit 40 of the image forming apparatus 1 enters the power-saving mode in which the DRAM 402 is caused to enter the self-refresh mode, the clock of the CPU 401 is stopped and power of a portion of the CPU 401 is turned OFF so as to reduce power consumption (S514).

After S510 or S514, if the image forming apparatus 1 receives an operation via the operation panel 20 (S515) and the received operation is a copy operation (YES in S516), the image forming apparatus 1 turns the fourth switch SW-4 ON so as to turn the image forming unit 40 ON (that is, the conduction state) and causes the image forming unit 40 to recover from the power-saving mode (S517), and executes a copy process (S518). If the received operation is not a copy operation (NO in S516), the image forming unit 40 is kept in the power-saving mode and the image forming apparatus 1 executes a process based on the received operation (S518). After the image forming apparatus 1 executes the process, the process returns to S401 of FIG. 8.

If a detection signal is output from the document detection sensor S3 or the pressing-plate sensor S4 before the second person detection sensor S2 detects a person in the flowcharts of FIGS. 9A and 9B, the image forming apparatus 1 may cancel the power-saving mode of the controller 10, and turn the first to third switches SW-1 to SW-3 ON so as to turn the operation panel 20 and the image scanning unit 30 ON (that is, the conduction state).

If no detection signal has been output from any of the sensors over a predetermined period after the second person detection sensor S2, the document detection sensor S3, and the pressing-plate sensor S4 were turned ON in the flowcharts illustrated in FIGS. 9A and 9B, the image forming apparatus 1 may turn the sixth to eighth switches SW-S2 to SW-S4 and the switch SW-5 OFF again.

The above is an example of processes executed by the image forming apparatus 1 according to the second exemplary embodiment.

Note that the flow illustrated in FIG. 6 described in the first exemplary embodiment may obviously be employed in the second exemplary embodiment.

In the above-described exemplary embodiments, when the first person detection sensor S1 detects a person in the power-saving mode, power supply to the second person detection sensor S2, the document detection sensor S3, and the pressing-plate sensor S4 is started. Alternatively, when the first person detection sensor S1 detects a person, power supply to the second person detection sensor S2 may be started. If the second person detection sensor S2 detects a person thereafter, power supply to the document detection sensor S3 and the pressing-plate sensor S4 may be started.

The present invention is not limited to the above-described exemplary embodiments. For example, the image forming apparatus 1 may include another function, such as a facsimile function. In such a case, the exemplary embodiments of the present invention may obviously be employed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
a plurality of processing units each of which is configured to operate in response to being supplied with electric power;
a first detector configured to detect, in response to being supplied with electric power, an object entering a first detection area;
a second detector configured to detect, in response to being supplied with electric power, an object entering a second detection area narrower than the first detection area; and
a first controller configured to control power supply to the plurality of processing units, the first detector, and the second detector, wherein:
the first controller is configured to, at a start of a power-saving mode, stop supplying electric power to the second detector and at least one processing unit among the plurality of processing units and supply electric power to the first detector,
the first controller is configured to, after the start of the power-saving mode, restart supplying electric power to the second detector in response to the first detector detecting an object entering the first detection area, and
the first controller is configured to, in response to the second detector detecting an object entering the second detection area in the power-saving mode, restart supplying electric power to the at least one processing unit that has not been supplied with electric power so as to cancel the power-saving mode,
wherein the plurality of processing units include:
an operation receiving unit configured to receive an operation from a user,
an image scanning unit configured to scan an image of a document,
an image forming unit configured to form an image on a medium, and
a second controller configured to control the operation receiving unit, the image scanning unit, and the image forming unit,
the first controller is configured to, at the start of the power-saving mode, stop supplying electric power to the second detector, the operation receiving unit, the image scanning unit, the image forming unit, and at least part of the second controller and supply electric power to the first detector, and
the first controller is configured to, in response to the second detector detecting an object entering the second detection area in the power-saving mode, restart supplying electric power to the operation receiving unit and the second controller,
a third detector configured to detect, in response to being supplied with electric power, opening and closing of a pressing plate that presses a document positioned on a document scan table of the image scanning unit from above; and
a fourth detector configured to detect, in response to being supplied with electric power, whether or not a document is positioned on a document feeder that feeds the document to the document scan table, wherein the first controller is configured to, at the start of the power-saving mode, stop supplying electric power to the second detector, the third detector, the fourth detector, the operation receiving unit, the image scanning unit, the image forming unit, and at least part of the second controller, and the first controller is configured to, after the start of the power-saving mode, the restart supplying electric power to the second detector, the third detector, and the fourth detector in response to the first detector detecting an object entering the first detection area.

2. The processing apparatus according to claim 1, wherein the first controller is configured to, in response to the third detector detecting opening and closing of the pressing plate in the power-saving mode, restart supplying electric power to the image scanning unit.

3. The processing apparatus according to claim 1, wherein the first controller is configured to, in response to the fourth detector detecting positioning of a document on the document feeder in the power-saving mode, restart supplying electric power to the image scanning unit.

4. The processing apparatus according to claim 1, further comprising:
a restriction unit configured to restrict detection signals from being output from the third detector and the fourth detector immediately after power supply to the third detector and the fourth detector is started.

5. The processing apparatus according to claim 1, wherein
the first controller is configured to, in a case where detection by the first detector and the second detector is disabled, supply electric power to the third detector and the fourth detector at the start of the power-saving mode, and the first controller is configured to, in response to detection by the third detector or the fourth detector in the power-saving mode, restart supplying electric power to the operation receiving unit, the second controller, and the image scanning unit so as to cancel the power-saving mode.

6. The processing apparatus according to claim 1, wherein the image forming unit includes a control circuit, and the first controller is configured to, in response to the second detector detecting an object entering the second detection area in the power-saving mode, supply electric power to the control circuit of the image forming unit and cause the control circuit to execute an initial startup process.

7. A processing apparatus comprising:
a plurality of processing units each of which is configured to operate in response to being supplied with electric power;
a first detector configured to detect, in response to being supplied with electric power, an object entering a first detection area;
a second detector configured to detect, in response to being supplied with electric power, an object entering a second detection area narrower than the first detection area; and
a first controller configured to control power supply to the plurality of processing units, the first detector, and the second detector, wherein:
the first controller is configured to, at a start of a power-saving mode, stop supplying electric power to the second detector and at least one processing unit among the plurality of processing units and supply electric power to the first detector,
the first controller is configured to, after the start of the power-saving mode, restart supplying electric power to the second detector in response to the first detector detecting an object entering the first detection area, and the first controller is configured to, in response to the second detector detecting an object entering the second detection area in the power-saving mode, restart supplying electric power to the at least one processing unit that has not been supplied with electric power so as to cancel the power-saving mode, wherein the plurality of processing units include:
an operation receiving unit configured to receive an operation from a user,
an image scanning unit configured to scan an image of a document,
an image forming unit configured to form an image on a medium, and
a second controller configured to control the operation receiving unit, the image scanning unit, and the image forming unit, the first controller is configured to, at the start of the power-saving mode, stop supplying electric power to the second detector, the operation receiving unit, the image scanning unit, the image forming unit, and at least part of the second controller and supply electric power to the first detector, and the first controller is configured to, in response to the second detector detecting an object entering the second detection area in the power-saving mode, restart supplying electric power to the operation receiving unit and the second controller, further comprising:
a third detector configured to detect, in response to being supplied with electric power, opening and closing of a pressing plate that presses a document positioned on a document scan table of the image scanning unit from above; and
a fourth detector configured to detect, in response to being supplied with electric power, whether or not a document is positioned on a document feeder that feeds the document to the document scan table, wherein the first controller is configured to, at the start of the power-saving mode, stop supplying electric power to the second detector, the third detector, the fourth detector, the operation receiving unit, the image scanning unit, the image forming unit, and at least part of the second controller, the first controller is configured to, in response to the first detector detecting an object entering the first detection area, restart supplying electric power to the second detector, and the first controller is configured to, in response to the second detector detecting an object entering the second detection area, restart supplying electric power to the third detector and the fourth detector.

8. The processing apparatus according to claim 7, wherein the first controller is configured to, in response to the third detector detecting opening and closing of the pressing plate in the power-saving mode, restart supplying electric power to the image scanning unit.

9. The processing apparatus according to claim 7, wherein the first controller is configured to, in response to the fourth detector detecting positioning of a document on the document feeder in the power-saving mode, restart supplying electric power to the image scanning unit.

10. The processing apparatus according to claim 7, further comprising,
a restriction unit configured to restrict detection signals from being output from the third detector and the fourth detector immediately after power supply to the third detector and the fourth detector is started.

11. The processing apparatus according to claim 7, wherein
the first controller is configured to, in a case where detection by the first detector and the second detector is disabled, supply electric power to the third detector and the fourth detector at the start of the power-saving mode, and
the first controller is configured to, in response to detection by the third detector or the fourth detector in the power-saving mode, restart supplying electric power to the operation receiving unit, the second controller, and the image scanning unit so as to cancel the power-saving mode.

12. The processing apparatus according to claim 7, wherein
the image forming unit includes a control circuit, and
the first controller is configured to, in response to the second detector detecting an object entering the second detection area in the power-saving mode, supply electric power to the control circuit of the image forming unit and cause the control circuit to execute an initial startup process.

13. A processing apparatus comprising:
a plurality of processing units each of which is configured to operate in response to being supplied with electric power, the plurality of processing units including:
an operation receiving unit configured to receive an operation from a user,
an image scanning unit configured to scan an image of a document,
an image forming unit configured to form an image on a medium, and
a second controller that configured to control the operation receiving unit, the image scanning unit, and the image forming unit;
a first detector configured to detect in response to being supplied with electric power, an object entering a first detection area;
a second detector configured to detect in response to being supplied with electric power, an object entering a second detection area narrower than the first detection area;
a third detector configured to detect in response to being supplied with electric power, opening and closing of a pressing plate that presses a document positioned on a document scan table of the image scanning unit from above;
a fourth detector configured to detect in response to being supplied with electric power, whether or not a document is positioned on a document feeder that feeds the document to the document scan table, and
a first controller configured to control power supply to the plurality of processing units, the first detector, the second detector, the third detector, and the fourth detector wherein
the first controller is configured to, at a start of a power-saving mode, stop supplying electric power to the second detector, the third detector, the fourth detector, the operation receiving unit, the image scanning unit, the image forming unit, and at least part of the second controller and supply electric power to the first detector,
the first controller is configured to, after the start of the power-saving mode, restart supplying electric power to the second detector, the third detector, and the fourth detector in response to the first detector detecting an object entering the first detection area, and
the first controller is configured to, in response to the second detector detecting an object entering the second detection area in the power-saving mode, restart supplying electric power to the operation receiving unit and the second controller.

14. A non-transitory computer readable medium storing a program causing a computer to function as:
a plurality of processing units each of which operates when in response to being supplied with electric power,
a first detector that detects, in response to being supplied with electric power, an object entering a first detection area, and
a second detector that detects, in response to being supplied with electric power, an object entering a second detection area narrower than the first detection area, the program causing the computer to execute a process, the process comprising:
at a start of a power-saving mode, stopping supplying electric power to the second detector and at least one processing unit among the plurality of processing units and supplying electric power to the first detector;
after the start of the power-saving mode, restarting supplying electric power to the second detector in response to the first detector detecting an object entering the first detection area; and
in response to the second detector detecting an object entering the second detection area in the power-saving mode, restarting supplying electric power to the at least one processing unit that has not been supplied with electric power so as to cancel the power-saving mode,
wherein the plurality of processing units include:
an operation receiving unit configured to receive an operation from a user,
an image scanning unit configured to scan an image of a document,
an image forming unit configured to form an image on a medium, and
a second controller configured to control the operation receiving unit, the image scanning unit, and the image forming unit,
the first controller is configured to, at the start of the power-saving mode, stop supplying electric power to the second detector, the operation receiving unit, the image scanning unit, the image forming unit, and at least part of the second controller and supply electric power to the first detector, and
the first controller is configured to, in response to the second detector detecting an object entering the second detection area in the power-saving mode, restart supplying electric power to the operation receiving unit and the second controller,
a third detector configured to detect, in response to being supplied with electric power, opening and closing of a pressing plate that presses a document positioned on a document scan table of the image scanning unit from above; and
a fourth detector configured to detect, in response to being supplied with electric power, whether or not a document is positioned on a document feeder that feeds the document to the document scan table, wherein
the first controller is configured to, at the start of the power-saving mode, stop supplying electric power to the second detector, the third detector, the fourth detector, the operation receiving unit, the image scanning unit, the image forming unit, and at least part of the second controller, and the first controller is configured to, after the start of the power-saving mode, the restart supplying electric power to the second detector, the third detector, and the fourth detector in response to the first detector detecting an object entering the first detection area.

* * * * *